United States Patent [19]

Nislar et al.

[11] Patent Number: 4,726,529

[45] Date of Patent: Feb. 23, 1988

[54] IRRIGATION PIPE CARRIER

[76] Inventors: Jerry N. Nislar; Dean J. Heinrich, both of P.O. Box 3398, Lubbock, Tex. 79452

[21] Appl. No.: 887,239

[22] Filed: Jul. 21, 1986

[51] Int. Cl.⁴ .......................... B05B 1/14; B05B 1/30; B05B 3/18

[52] U.S. Cl. .................................. 239/742; 239/536; 239/576; 239/726

[58] Field of Search ............... 239/723, 726, 732, 734, 239/742, 269, 536, 576, 66; 137/355.24, 372, 615, 803; 405/51; 47/48.5; 406/43, 155

[56] References Cited

U.S. PATENT DOCUMENTS

| 854,680 | 5/1907 | Wiberg | 239/726 |
| 3,729,140 | 4/1973 | Wagner | 239/726 X |
| 3,880,189 | 4/1975 | Bennett | 137/883 |
| 3,887,132 | 6/1975 | Widmer | 239/166 |
| 4,359,297 | 11/1982 | Butler | 405/51 X |
| 4,405,085 | 9/1983 | Meyer | 239/169 |

FOREIGN PATENT DOCUMENTS 554343  3/1958  Canada ............................... 137/615

Primary Examiner—Andres Kashnikow
Assistant Examiner—Patrick N. Burkhart
Attorney, Agent, or Firm—Wendell Coffee

[57] ABSTRACT

Gated pipe is mounted upon trucks. A chain is provided at each end so that the gated pipe may be towed from one position to another. Tubes are connected to necks on the gated pipe to convey the water from a dry turn row upon the field to be watered. The gate valves are located in the tubes so that the tubes with the gate valves and other flexible material may be removed to be stored in a sheltered place. A surge valve and supply connection are placed upon a center truck for surge irrigation.

11 Claims, 5 Drawing Figures

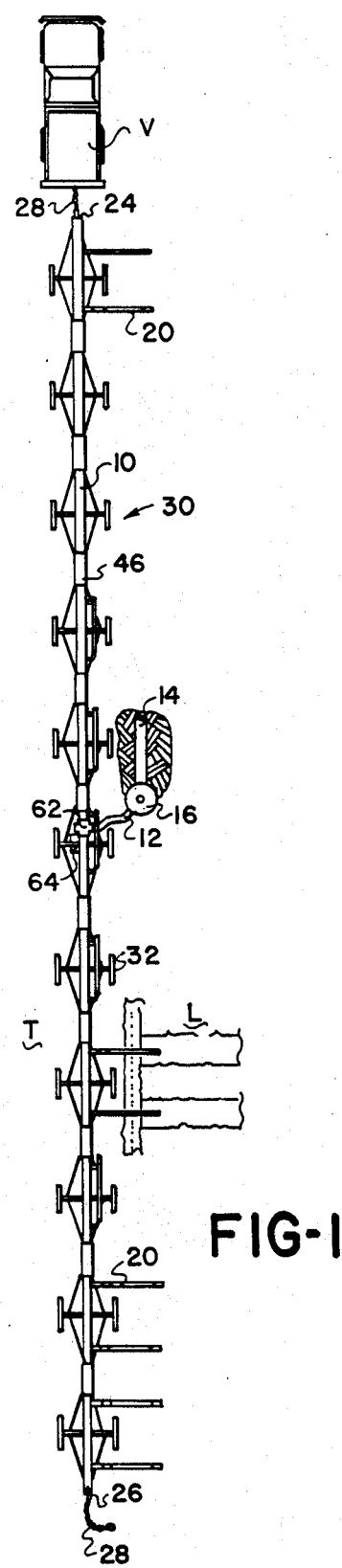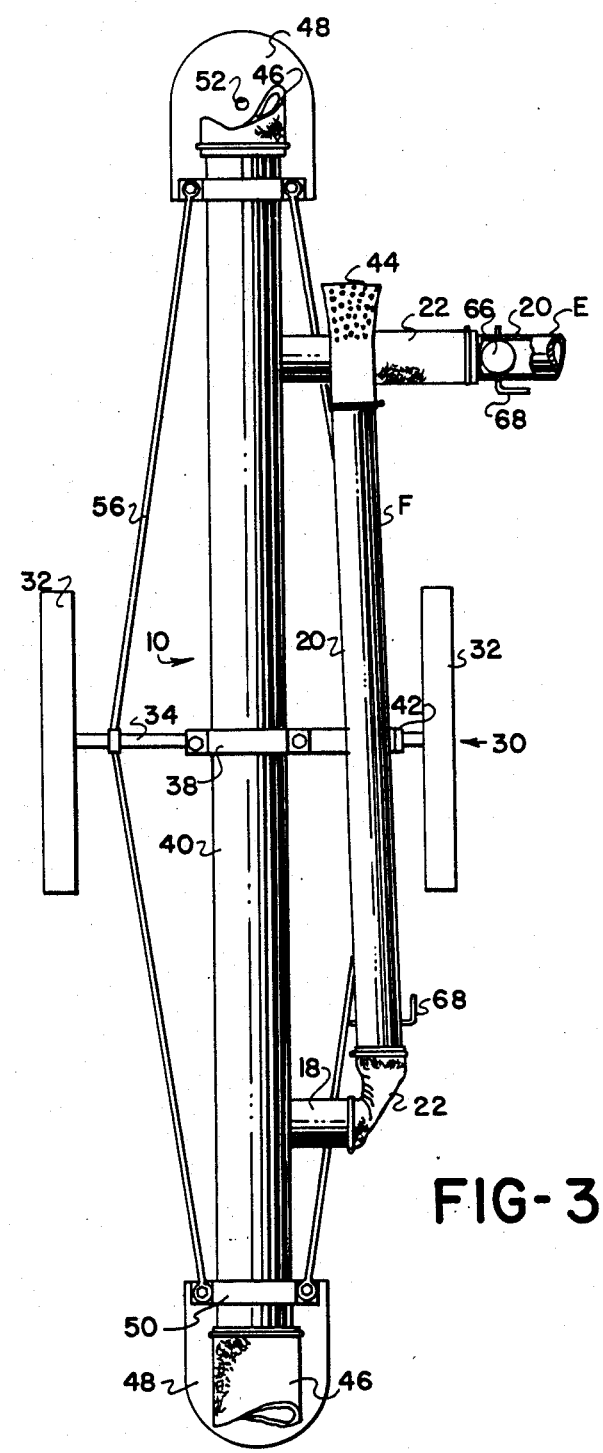
FIG-1
FIG-3

IRRIGATION PIPE CARRIER

RIGHTS TO INVENTIONS MADE UNDER FEDERAL RESEARCH

There was no Federally-sponsored research and development concerning this invention.

BACKGROUND OF THE INVENTION (1) Field of the Invention

This invention relates to agricultural irrigation and more particularly to irrigating crops by flowing water along furrows.

(2) Description of the Prior Art and Related Art

It has long been known that one type of agricultural irrigation is by gated pipe. Gated pipe is so named because it has necks with valves at regular intervals, e.g., every 40". If the valve is open, water will flow through the neck if the furrows of the crop land are spaced at 40" intervals and it is desired to water every row, then every valve can be open and the water flow out of each neck into a furrow to irrigate it. Of course, if because of agricultural practices it is only desired to water every third row, then every third valve (or gate) could be opened.

Gated pipe is often used with permanent underground supply pipes. These underground supply pipes having surface valves at regular intervals at the surface of the ground. The surface valves are sometimes called alfalfa valves in the trade. Gated pipe can be connected to these valves.

After one hand or portion of a field is watered, the gated pipe is manually disconnected from one surface valve of the supply pipe, manually moved to the next surface valve of the supply pipe, reconnected, the surface valve opened, and the irrigation continued. Above ground supply pipes are often used instead of underground supply pipes.

In certain instances, short, flexible socks, such as short tubes of canvas would be connected to the necks and put into the rows to prevent the water from eroding the furrows where the water flowed from the neck of the gate into the furrow. This might be considered somewhat similar to the disclosure of SCHUTMAAT, U.S. Pat. No. 2,174,600.

Also, in recent times, the fields have been irrigated by a surge valve attached to the gated pipe. In irrigation using a surge valve, the water is connected from the supply pipe into the surge valve. The gated pipe is connected to surge valve with half the gates located to one side of the surge valve and half the gates connected to the other side. Then, the surge valve automatically alternates the water from the supply pipes to one half of the gates or the other half of the gates of the gated pipe. There are many manufactures of surge valves as discussed in the May 1986 edition of *The Cross Section*, vol. 32, no. 5, page 2. *The Cross Section* is a monthly publication of the High Plains Underground Water Conservation District No. 1, Lubbock, Tex. The advantages of the surge valve is that the same land can be watered more evenly with less water and less time. Some surge valves weigh as much as 100 pounds in addition to a 12 volt battery used to supply power to the surge valve.

Before this invention, the surge valve, battery, and gated pipe were manually handled upon completion of irrigating one land or portion of a field.

On a commercial basis, the gated pipe, used with or without a surge valve, was always moved by hand from one valve to another. Sometimes, the joints of the pipe may have been disconnected and loaded onto a cart or wagon, but they were always disconnected, loaded, unloaded, and reconnected by hand.

Before this invention, the gated pipe was normally put on the ground and the water flowed from the necks within 3" to 4" of the gated pipe. To keep the water from flowing upon the turn row, it was necessary to build a dike or a dam between the rows and the turn row so that all the water was directed into the field and not upon the turn row. Normally, the gated pipe would be on the field side of the dam, i.e., in the mud and water. Therefore, to move the pipe, normally the farmer had to wade in the mud, lift heavy equipment, etc.

The manual handling of a 100 pound surge valve and connecting and disconnecting a 12 volt battery is difficult.

In sprinkler irrigation systems a pipe has several sprinklers attached to the pipe for the distribution of the water from the pipe. Some sprinkler irrigation systems have carriages or trucks attached to the pipe to move the pipe axially of the pipe.

Before this application was filed, the applicant caused a search to be made in the U.S. Patent and Trademark Office. That search showed many patents having carriages for moving sprinkler irrigation pipe axially of the pipe. In addition to SCHUTMAAT, discussed above, the following patents were found on that search:

WIBERG U.S. Pat. No. 854,680
MITCHELL U.S. Pat. No. 1,429,756
TOBIN U.S. Pat. No. 2,742,319
CORNELIUS U.S. Pat. No. 2,769,664
TOUTON U.S. Pat. No. 2,803,498
INGRAM ET AL U.S. Pat. No. 3,057,559
MORGAN U.S. Pat. No. 3,324,876
WAGNER U.S. Pat. No. 3,729,140

These patents are considered pertinent because the applicant believes the Examiner would consider anything revealed by an experienced patent searcher to be relevant and pertinent to the examination of this application. CL SUMMARY OF THE INVENTION (1) Progressive Contribution to the Art This application discloses the invention whereby the gated pipe is permanently mounted on a carrier in the form of individual carts or trucks. Therefore, the pipe can be transported by attaching a towing vehicle, such as a pickup truck, to the gated pipe and towing it to the new location.

The preferred embodiment utilizes a two wheel cart or truck to be attached at the middle of each length or joint of gated pipe. The gated pipe is connected together by flexible joints in the form of flexible sleeves such as made from canvas or synthetic material. The joints would be structurally connected by clamping a half hinge to each pipe and have the hinges pivoted together about a vertical pin or bolt.

It will be understood that this invention is particularly advantageous with the surge system of irrigation. Since the land is watered in less time, it is necessary to move the gated pipe more often. Therefore, if the gated pipe can move quickly by a towing vehicle, less time is spent moving the pipe; and therefore, a greater percentage of time is spent flowing the water upon the field to be irrigated.

With the trucks attached to the pipe as described, the gated pipe will track the towing vehicle to a reasonable degree. I.e., as disclosed in INGRAM ET AL, (see above) the towed pipe will basically follow in that tracks of the towing vehicle, although not precisely so.

an elongated tube, preferably rigid, is attached by a small flexible sleeve to the necks in the gated pipe. This is necessary because the gated pipe is maintained on dry land, away from the agricultural field upon which the water is flowed. The truck will run on the turn row side of the dam or dike. Therefore, with the flexible tube connecting the rigid tubes to the gated pipe, the tubes can be extended out to the row to be irrigated. Also, this gives a certain amount of latitude in case the necks of the gated pipe are not exactly aligned with the furrows of the land. Also, the rigid tubes will act to make a better transition of the water into the furrow so that undesirable erosion is reduced. When the gated pipe is to be moved, each of the rigid pipes can quickly be folded or moved from a position transverse of the gated pipe to a position parallel to the gated pipe and the rigid tube supported in racks upon the gated pipe or the trucks.

In contrast with the prior art, it may be seen that the gated pipe, together with its trucks, the surge valve, and the farmer when operating, would all be located upon dry ground of the turn row, and there would be no need for the farmer, the gated pipe, or any of the equipment to be in the mud.

Also, this invention places the gates or valves within the tube which is connected by flexible hose to the neck. With this arrangement, the tubes, together with the flexible hose by which they are connected to the neck are disconnected from the neck and stored in a sheltered place when not in use. Being stored in a sheltered place greatly extends the life of the gate valves as well as the flexible tubes. If the farmer desires, he can quickly and easily disconnect the different joints of the gated pipe so that they too can be stored in a compact manner. However, since the tubes and the surge valves are already removable from the remainder of the gated pipes, these units can be left on the turn rows connected. Most farmers will prefer, however, to take the particular joint or truck upon which the surge valve and battery is mounted and store it in a sheltered place when not in use.

(2) Objects of this Invention

An object of this invention is to irrigate agricultural fields by flowing water thereon.

Further objects are to achieve the above with devices that are sturdy, compact, durable, lightweight, simple, safe, efficient, versatile, ecologically compatible, energy conserving, and reliable, yet inexpensive and easy to manufacture, connect, adjust, move, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a schematic top view showing the general layout of an embodiment of this invention.

FIG. 3 is a top plan view of one truck with one tube folded and one tube extended.

Figure 4:
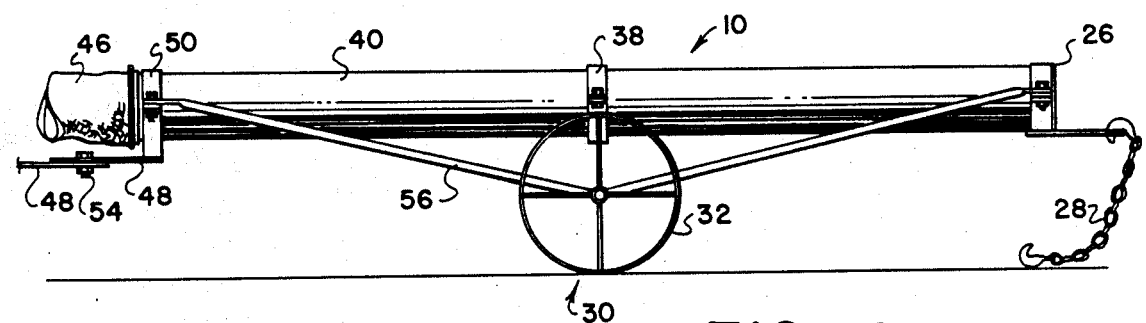
FIG. 4 is a side elevational view of the end truck.
Figure 5:
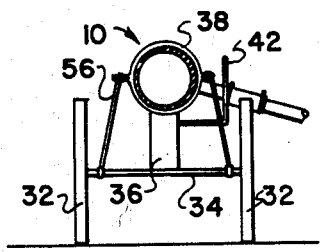
FIG. 5 is a cross sectional view of one truck taken substantially on line 5—5 of FIG. 4.

As an aid to correlating the terms of the claims to the exemplary drawing, the following catalog of elements is provided:
10 gated pipe
12 supply means
14 underground supply pipe
16 surface valve
18 necks
20 tube
22 tube connection
24 one end
26 other end
28 chain
30 trucks
32 pair of wheels
34 axle
36 pedestal
38 saddle
40 joint
42 rack
44 sock
46 joint connections
48 pivot plates
50 saddle or band
52 vertical hole
54 vertical bolt pin
56 tie rods
60 center truck
62 surge valve
64 battery
66 gate valves
E-extended position
F-folded position
L-land
D-dike or dam
T-turn row
V-towing vehicle

DESCRIPTION OF THE PREFERRED EMBODIMENT

Referring to the drawings, there may be seen a schematic representation in FIG. 1 of an elongated gated pipe 10 connected by a supply means in the form of a flexible pipe or hose 12 to a supply pipe 14 having water therein. As illustrated, a supply pipe would be an underground pipe having a surface valve 16 by which the supply means 12 was connected to the underground supply pipe 14. The gated pipe has a plurality of necks 18 connected thereto.

Figure 2:
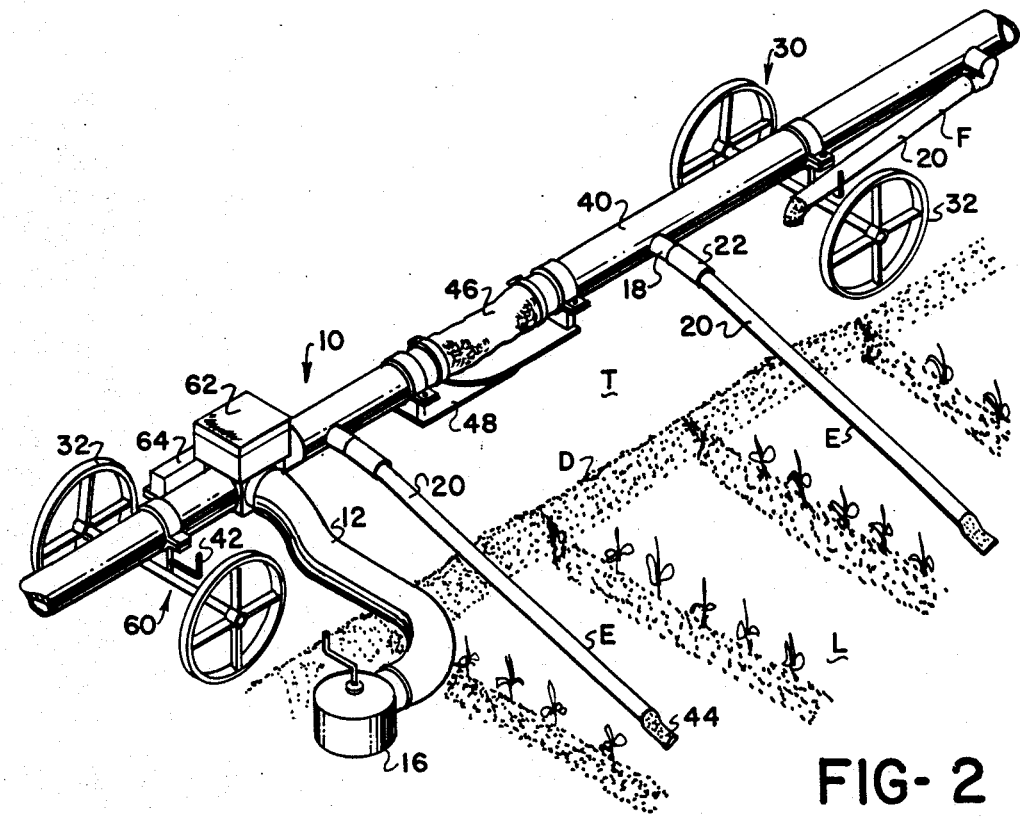
FIG. 2 is a perspective view showing a part of two joints of pipe and the supply truck with the surge valve, with the tie rods omitted for clarity.

A tube 20 is connected to each neck 18 by a flexible tube connection 22. As seen in the drawing, with the flexible tube connection, the pipe can be in either of two positions, either in an extended position "E" or a folded position "F". Referring to the drawings, and particularly FIG. 2, it may seen that when the pipe is in the extended position "E", water can be in flow from the gated pipe 10 through the neck into the extended tube 20 and into a furrow of the land "L" to be watered. Also referring to FIG. 2 (as well as FIG. 1) there may be seen a dike or dam "D" to maintain the water upon the land "L" rather than upon the turn "T", upon which the gated pipe is kept.

The gated pipe will have two ends 24 and 26. Chain 28 is connected to each end 24 and 26 so that the gated pipe may be attached to a towing vehicle "V" such as a pickup truck. It will be understood that the towing vehicle could also be a farm tractor and that the chain 28 could be connected around the tool bar or any other convenient portion of the farm tractor and towed by it. The chains 28 form means for towing the gated pipe axially from either end.

The gated pipe 10 is supported by a series of trucks 30. Each of the trucks includes a pair of wheels 32 journaled to an axle 34. As may be seen, the axles 34 are traverse of the axis of the gated pipe 10 so that the trucks form a means for moving the gated pipe in an axial direction. The truck includes pedestal 36. Saddle 38 upon the top of the pedestal 36 securely clamps one joint 40 of the gated pipe 10 to the truck 30. Rack 42 is attached to the truck 30 to receive the tubes 20 when in the folded position. Sock 44 is connected to the distal end of the tube 20 within the furrows of the land "L" to prevent erosion of the water flowing into the furrow.

The joints 40 of the gated pipe are fluidly connected together by flexible fluid joint connections 46. The joints 40 are structurally connected together by pivot plates 48. Each pivot plate is connected to an end of the joint 40 by saddle or band 50. The pivot plates have a vertical hole 52 therein through which vertical bolt or pin 54 may be placed. Thus, the joints 40 are connected together so that they may be towed by the chain 28. As the towing vehicle "V" turns, the pipe will basically track or follow in the same tracks as the towing vehicle although not exactly. The trucks 30 are about the midpoint of each joint 40. Tie rods 56 extend from the band 50 to the axle 34 to provide stability to the vehicle formed by the joint 40 and the truck 30 together with the structural connection which includes the elements of the pivot plates 48, band 50, and bolt 54.

Center truck or supply truck 60 is at the midpoint of the gated pipe 10. Stated otherwise, there are as many necks 18 on one side of the truck 60 as there are on the other side. Surge valve 62 is mounted upon the center truck 60. The surge valve 62 forms a portion of the supply means 12 by which water is supplied from the supply pipe 14 to the gated pipe 12. The center truck 60 is the same as the other trucks 30 except for having the surge valve 62 mounted thereon and also having a small rack by which battery 64 is mounted thereon. The 12 volt battery is mounted on the center truck to provide power for operating the surge valve 62.

The gates or butterfly valves 66 are located at the necks 18 in the tubes 20 adjacent to the flexible tube connection 22. Therefore, the flexible tube connection 22 may be readily disconnected from the neck 18 and then the butterfly valve 66, with the flexible tube connection 22, can be stored in a sheltered place so that the valve 66, the flexible tube connection 22, and the sock 44 do not deteriorate from exposure, particularly to sunlight, heat, and cold. The butterfly valve is controlled by the handle 68. Those having ordinary skill in the art will understand that normally the gates or valves are located within the necks 18. However, for the reasons stated above, I prefer to locate the gates or valves 66 within the tubes 20. It is desirable that they be located as close as possible to the flexible connection 22 so that they may readily be operated by a farmer standing on the dry ground of the turn row "T" rather than requiring him to be in the mud on the field or land side "L" of the dike "D".

In operation, it will be understood by those skilled in the art, that as soon as one land is completely watered, the surface valve 16 would be turned off, that the tubes 20 would be folded upon the rack in the folded position "F" and that the supply means 12 would be disconnected from the valves 16. Then, the chain 28 would be connected to some form of a towing vehicle and the gated pipe 10 towed axially until the supply means 12 was again opposite or adjacent to another surface valve 16. At that time, the supply means 12 would be connected to the new surface valve 16, the tubes 20 unfolded, and the surface valve opened to supply water into the gated pipe 10. At that time, surge valve 62 would cause water to be flowed to one side of the gated pipe, supplying half of the necks and the tubes causing the water to run through them very rapidly. After a preset period of time, the water would be turned off one half and started on the other half, all as is well known in surge irrigation. Upon completion of watering of that land "L" the pipe would again be moved.

The embodiment shown and described above is only exemplary. We do not claim to have invented all the parts, elements or steps described. Various modifications can be made in the construction, material, arrangement, and operation, and still be within the scope of our invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. Irrigation equipment for flowing water over agricultural land having:
   a. a supply pipe containing water,
   b. a gated pipe having two ends and a plurality of
   c. necks thereon, and
   d. supply means for fluidly connecting the gated pipe to the supply pipe;
wherein the improved structure comprises in combination with the above:
   e. trucks on the gated pipe for moving the gated pipe in an axial direction,
   f. a plurality of tubes,
   g. a flexible tube connection fluidly connecting each tube to one of the necks, so that, either each tube is extended from the gated pipe for watering, or each tube is folded along the gated pipe for moving.

2. The invention as defined in claim 1 further comprising:
   h. a gate valve at each neck.

3. The invention as defined in claim 1 wherein said supply means is connected to the gated pipe half way between the ends thereof.

4. The invention as defined in claim 1 wherein said supply means has half of the necks on one side and half of the necks on the other and includes:
   h. surge valve means for automatically alternating the water from the supply pipe to one or the other halves of the necks on the gated pipes.

5. The invention as defined in claim 1 further comprising:
   h. towing means at each end of the gated pipe for towing the gated pipe axially.

6. The invention as defined in claim 1 wherein each tube has a butterfly gate valve therein adjacent to the flexible tube connection.

7. The invention as defined in claim 1 wherein the flexible tube connections are removable from the neck so that the tubes and tube connections may be placed in storage in off seasons.

8. The invention as defined in claim 1 further comprising:
  h. racks on the trucks for holding the tubes when the tubes are folded along the gated pipe for moving.

9. The invention as defined in claim 1 wherein said gated pipe is composed of:
  h. a series of joints fluidly connected by
  i. flexible fluid joint connections, and
  j. wherein each joint has one of said trucks at the midpoint thereof, and
  k. pivots structurally connecting the joints so that the gated pipe may be towed around corners.

10. The invention as defined in claim 9 wherein the joints of the gated pipe may be readily disconnected so that the disconnected joints of the gated pipe can be placed in a compact position for storage.

11. Irrigation equipment for flowing water over agricultural land having:
  a. a supply pipe containing water,
  b. a gated pipe having two ends and a plurality of
  c. necks thereon, and
  d. supply means for fluidly connecting the gated pipe to the supply pipe;
wherein the improved structure comprises in combination with the above:
  e. a supply truck connected to said supply means,
  f. a surge valve mounted upon said supply truck,
  g. a battery mounted on said supply truck for furnishing operating power to said surge valve,
  h. said surge valve connected on one side to the gated pipe having half the total necks and connection on the other side to the gated pipe having the other half of the necks,
  i. said gated pipe is in the form of a series of joints, each of the joints fluidly connected by
  j. flexible joint connectors,
  k. a truck under the midpoint of each joint,
  l. all of the said trucks forming means for moving the gated pipe and surge valve in an axial direction,
  m. pivots between each joint so that the gated pipe may be towed around corners,
  n. a plurality of tubes,
  o. flexible tube connection fluidly connecting each tube to one of the necks, so that, either each tube is extended from the gated pipe for watering, or each tube is folded along the gated pipe for moving,
  p. a butterfly gate valve in each tube adjacent to the flexible tube connection,
  q. said flexible coupling being readily removable from the necks so that the tubes, tube connections, and gate valves may be placed in storage for off seasons,
  r. racks on the trucks for holding the tubes when the tubes are folded along the gated pipe,
  s. said joints of pipe may be readily disconnected so that the disconnected joints of gated pipe may be placed in compact position for storage, and
  t. towing means at each end of the gated pipe for towing the gated pipe axially.

\* \* \* \* \*